United States Patent

[11] 3,585,878

| | | |
|---|---|---|
| [72] | Inventor | Ernest W. Heckenbach, Jr.<br>Chicago, Ill. |
| [21] | Appl. No. | 889,488 |
| [22] | Filed | Dec. 31, 1969 |
| [45] | Patented | June 22, 1971 |
| [73] | Assignee | Bell & Howell Company<br>Chicago, Ill. |

[54] VARIABLE SPEED DRIVE MECHANISM FOR MOTION PICTURE PROJECTORS
11 Claims, 5 Drawing Figs.

[52] U.S. Cl. .................................... 74/675,
74/198, 74/796
[51] Int. Cl. .................................... F16h 37/06,
F16h 15/26, F16h 15/50
[50] Field of Search ............................ 74/217 CV,
198, 675, 796

[56] References Cited
UNITED STATES PATENTS

| | | | |
|---|---|---|---|
| 2,901,924 | 9/1959 | Banker | 74/796 X |
| 2,953,039 | 9/1960 | McRae | 74/796 X |
| 3,293,947 | 12/1966 | Chery | 74/198 X |
| 3,367,198 | 2/1968 | Schottler | 74/198 |

*Primary Examiner*—Leonard H. Gerin
*Attorney*—Finnegan, Henderson & Farabow

ABSTRACT: A variable speed drive mechanism is provided for controlling the speed of a motion picture projector powered by an electric motor operating at a constant speed. The mechanism includes a drive wheel rotatable driven by the electric motor about an axis of rotation, a power takeoff wheel rotatably mounted for independent rotation about the same axis, a plurality of balls rotatably captured between the drive wheel and the power takeoff wheel to cause rotation of the power takeoff wheel in response to rotation of the drive wheel, and means for translating the balls without disengagement from the drive and power takeoff wheels along a path concentric with the axis of rotation of the drive and power takeoff wheels to vary the speed of rotation of the power takeoff wheel.

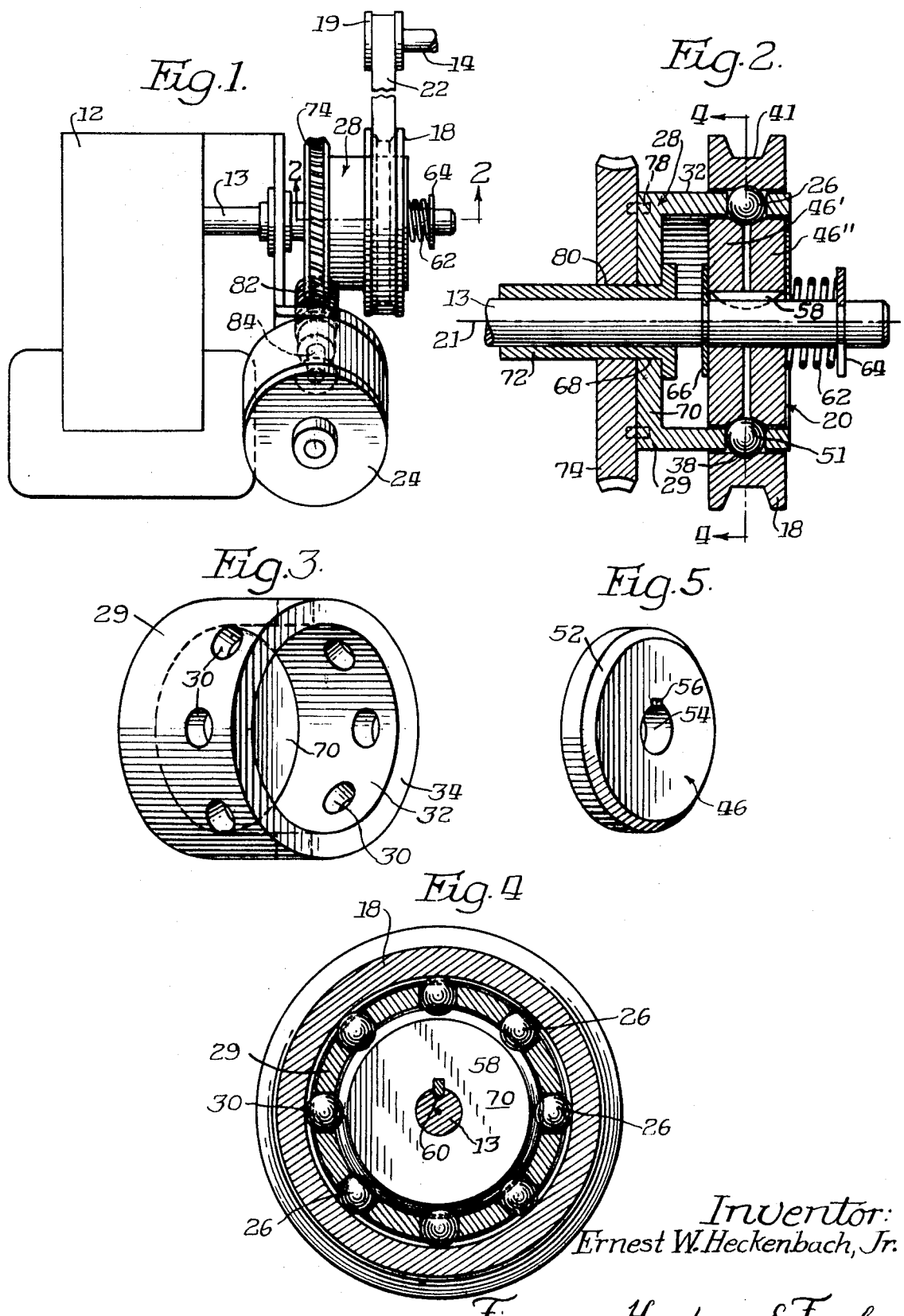

VARIABLE SPEED DRIVE MECHANISM FOR MOTION PICTURE PROJECTORS

This invention relates to variable speed drive mechanisms, and more particularly to a variable speed differential type drive mechanism for varying the output speed of a constant speed electric motor.

Shaded pole electric motors possess many desirable characteristics for driving mechanisms, such as motion picture projectors. These characteristics include adequate power for driving projectors, ability to operate at acceptably low acoustical and electrical noise levels, and predictability in output performance insofar as torque versus input power is concerned. Also, they are self-starting and relatively inexpensive to manufacture. Because of these many desirable operating characteristics, shaded pole motors are preferred for use in motion picture projector systems that are designed to be synchronized with another apparatus, such as another projector or a tape recorder, by an electrical signal. However, such motors change rates only a small amount between start and stop with a relatively large variation of input voltage. Thus, it is difficult to vary the speed of these motors by direct electrical means.

The present invention permits control by an electrical signal of the output speed of a drive mechanism powered by a constant speed electric motor, and in particular permits the use of a shaded pole motor for driving a motion picture projector in applications where the rate of operation of the film movement mechanism must be varied to synchronize the projection of images with another operation, such as audio output from a sound reproducing means.

Manual control of the film speed of the projector is also possible with the drive mechanism of the present invention by providing a manually operated control mechanism that produces a varied electrical signal corresponding to the desired output speed of the projector.

Further, the variable speed drive mechanism of the present invention is constructed of a minimum number of parts that cooperate in a positive and essentially maintenance-free manner and is compact and operated without generating objectionally loud noises.

In accordance with the invention, the variable speed drive mechanism for use with a motive power source for rotating the mechanism at a constant speed comprises a drive wheel rotatably driven by the motive source about an axis of rotation, a power takeoff wheel rotatably mounted for independent rotation about the same axis of rotation, power transmitting means rotatably mounted between and operably connecting the drive wheel with the power takeoff wheel to cause rotation of the power takeoff wheel in response to rotation of the drive wheel, and regulator means for translating the power transmitting means without disengagement from said wheels and while the drive wheel is rotatably driven along a path concentric with said axis of rotation to vary the speed of rotation of the power takeoff wheel.

Preferably, the regulator means includes a control wheel rotatably mounted about said axis of rotation and located between the drive wheel and the takeoff wheel, and the power transmitting means comprises a plurality of balls rotatably captured in spaced relation in the control wheel.

In a more preferred embodiment, the power takeoff wheel is mounted for concentric rotation around the outer periphery of the drive wheel and the control wheel comprises an annular drum rotatably mounted between the wheels and having a plurality of circumferentially spaced sockets for rotatably capturing the balls.

The accompanying drawings illustrate an example of a preferred embodiment of the invention, and together with the description, serve to explain the principles of the invention.

Of the drawings:

FIG. 1 is a perspective view of the variable speed drive mechanism of this invention;

FIG. 2 is a horizontal enlarged section taken along line 2-2 of FIG. 1, and showing in greater detail the variable speed drive mechanism of this invention;

FIG. 3 is a perspective view of the control wheel;

FIG. 4 is a vertical section taken along the line 4-4 of FIG. 2; and

FIG. 5 is a perspective view of one of the pair of discs that cooperate to form the drive wheel.

As shown in FIG. 1, an electric motor 12 operating at a constant speed and having a main drive shaft 13 is provided to supply rotary motive power to a power takeoff wheel 18. Wheel 18, in the form of a pulley, (in turn), transmits power to the driven shaft 14, such as the main camshaft of a motion picture projector by an output drive means, here illustrated as a pulley 19 on a shaft 14, connected to the power takeoff wheel 18 by an endless belt 22.

In accordance with the invention, control of the revolutions per minute of power takeoff wheel 18 is effected by a variable speed drive mechanism, generally 28, which controls the production of rotation producing forces that are applied to the power takeoff wheel 18 by motor 12. Since changing the rotation producing forces applied to power takeoff wheel 18 changes its speed of rotation, the output therefrom can be varied without changing the speed of rotation of motor 12.

Preferably, for driving a mechanism such as a motion picture projector, motor 12 is a shaded pole, single phase induction motor. It will be obvious to one skilled in the art, however, that the variable speed drive mechanism of the invention is useful in varying the output drive from any motor and may be used to drive a variety of machines in addition to motion picture projectors.

In accordance with the invention and as best shown in FIG. 2, the variable speed drive mechanism includes a drive wheel, generally 20, mounted on drive shaft 13 and rotatably driven by electric motor 12 about an axis of rotation 21. Preferably, and as more fully described below, drive wheel 20 consists of a pair discs 46 mounted side by side on main drive shaft 13. As shown in FIG. 5, each disc 46 has a central axial bore 54 and an axially extending rectangular slot 56. The slots are aligned with each other when the discs are mounted on main drive shaft 13. Main drive shaft 13 is also provided with an axially extending slot 60 (see FIG. 4) and a key 58 is seated in aligned rectangular slots 56 in discs 46 and axially extending slot 60 in shaft 13 so that discs 46 rotate with main drive shaft 13. Each disc 46 also has a slanted angular face 52, which faces are adjacent each other when the discs are mounted on shaft 13, and cooperate to form a ball race 51 around the outer periphery of drive wheel 20.

In accordance with the invention, power takeoff wheel 18 is rotatably mounted for independent rotation about the axis of rotation 21 of drive wheel 20. As here embodied and as best shown in FIG. 2, power takeoff wheel 18 is rotatably mounted about the axis 21 of main drive shaft 13 so that it can rotate concentrically around the outer periphery of drive wheel 20. Power takeoff wheel 18 is provided with an arcuate recess 38 extending about the entire inner periphery of the wheel to form an outer ball race cooperating with an inner ball race 51 formed by cooperating portions 52 of drive wheel 20. Wheel 18 has an outer groove 41 extending about the outer circumference of the wheel to form a pulley sheave for endless belt 22.

In accordance with the invention, power transmitting means are provided which are rotatably mounted between and operably connect the drive wheel with the power takeoff wheel to cause rotation of the power takeoff wheel in response to rotation of the drive wheel. As here embodied, this means comprises at least three balls 26 which are mounted for rotation in a control wheel 29. As best shown in FIG. 3, control wheel 29 comprises an annular drum having an annular portion 32 that is located between the outer surface of drive wheel 20 and the inner surface of concentrically mounted power takeoff wheel 18. Preferably, eight balls are used which are rotatably captured by spaced sockets 30 bored in annular portion 32 of control wheel 29. As best shown in FIGS. 3 and 4, balls 26 are equally spaced about the circumference of wall portion 32 and are equally distanced from the outer rim 34 of wheel 29. Balls 26 are rotatably positioned within spaced sockets 30 of control wheel 29 between the ball race 51 formed around the outer periphery of drive wheel 20 and the ball race 38 formed around the inner periphery of power takeoff wheel 18.

In accordance with the invention, regulator means are provided for translating the power transmitting means without disengagement from the drive and power takeoff wheels, and while the drive wheel is rotating along a path concentric with the axis of rotation of the drive and power takeoff wheels to vary the speed of rotation of the power takeoff wheel. As here embodied, the regulator means comprises control wheel 29 and means for rotating the control wheel about axis 21 of main drive shaft 13 independent of rotation of drive wheel 20 so that the balls 26 captured within wheel 29 can be translated about the axis of rotation of the drive wheel to vary the speed of rotation of power takeoff wheel 18.

Preferably, and as best shown in FIGS. 2 and 3, control wheel 29 has a base portion 70 integral with annular portion 32. Base portion 70 has a central opening 68 through which an axially extending oilite bearing 72 is fitted, the bearing being slidably mounted about drive shaft 13.

The means for rotating control wheel 29 includes a gear 74 connected to base member 70 by studs 78 (FIG. 2). A variable speed drive motor 24 is operatively connected to gear 74 (FIG. 1) by a worm gear 82 mounted on a shaft 84 of the variable speed motor. Gear 74 contains a central opening 80 through which bearing 72 is fitted and is thus rotatably supported by and rotates about main drive shaft 13.

In accordance with the invention, biasing means are further provided for urging balls 26 into tight engagement between drive wheel 20 and power takeoff wheel 18. As embodied, and as shown in FIG. 2, the biasing means comprises the pair of discs 46 that are mounted for rotation with drive shaft 13 but are slidable axially along its length. A ring 66 affixed to shaft 13 abuts the outer face of one of the discs 46' and a spring 62 is located between the outer face of the other disc 46'' and a second ring 64 that is also affixed to shaft 13. Spring 62 thus urges disc 46'' toward disc 46' to narrow the ball race 51 and keep balls 26 in tight engagement with power takeoff wheel 18.

It will be realized by those skilled in the art that the invention is useful in numerous applications where variation of the output speed of a rotary machine is required. For example, the present drive mechanism can be synchronized with another apparatus by an electrical signal, or can be remotely controlled by manually varying an electrical control signal and transmitting this control signal to the variable speed motor.

In the utilization of this invention for driving a motion picture projector, variable speed drive motor 24 is preferably a small permanent magnet direct current motor which has an output speed directly proportional to the voltage applied to it. THe varying voltage signal acting through such a motor will permit regulation of the speed of a projector. In the following description of the operation of the apparatus, the use of a varying voltage signal and a permanent magnet direct current motor is assumed. However, it will be apparent to one skilled in the art that other types of variable speed motors and other control members for such motors can be used.

In operation, electric motor 12 drives discs 46 keyed to shaft 13 at a constant speed. With variable speed drive motor 24 stationary, control wheel 29 is held fixed, and discs 46 drive balls 26 and rotate them within their sockets 30 in a direction opposite from that of motor shaft 13. Balls 26 in turn apply rotation producing forces to power takeoff wheel 18 to rotate it in the opposite direction of motor shaft 13.

To vary the speed of wheel 18, variable speed drive motor 24 is actuated to rotate control wheel 29 in the same direction as drive wheel 20. By rotating control wheel 29 in the direction of drive wheel 20, the rotational forces transmitted to power takeoff wheel 18 by balls 26 are reduced thereby reducing the angular velocity of wheel 18, and hence the linear speed of belt 22 and the speed of main camshaft 14 of the projector.

The relationship between the angular velocity of power takeoff wheel 18 and drive wheel 20 as a function of the angular velocity of control wheel 29 can be expressed by the following equation:

$$V_o = \frac{D_i}{D_o}\left[V_i - \left(\frac{D_i + D_b}{D_i}\right)V_c\right]$$

where:

$V_o$ is the angular velocity of power takeoff wheel 18,
$V_i$ is the angular velocity of drive wheel 20,
$V_c$ is the angular velocity of control wheel 29,
$D_i$ is the effective diameter of drive wheel 20,
$D_o$ is the effective diameter of power takeoff wheel 18,
$D_b$ is the effective diameter of balls 26.

Thus, it can be seen from the foregoing equation that as the rotational speed of control wheel 29 increases, the rotational speed of main camshaft 14 of the projector decreases, and that maximum speed of camshaft 14 is reached when control wheel 29 is at rest.

Hence, by controlling the rotational speed of control wheel 29 with variable speed drive motor 24, it is possible to vary the speed of main camshaft 14 of the projector without changing the rotational speed of motor 12.

A control means (not shown), such as electrical voltage signal, can act on variable speed drive motor 24 to vary the speed of this motor which, in turn, acts through its motor shaft 84, worm gear 82, and worm gear 74 to vary the speed of control member 29.

In an alternative embodiment of the invention, a reversible variable speed motor is provided so that the control wheel can rotate in a direction opposite from that of drive wheel 18 and increase the angular velocity of the drive wheel and, hence, the speed of main camshaft 14 of the projector.

The time lag of the drive mechanism in responding to changes in the value of the electrical signal is small. This feature is important when it is desired to effectively synchronize the drive of the motion picture projector with another operation by an electrical signal.

The invention in its broader aspects is not limited to the specific details shown and described but departures may be made from such details without departing from the principles of the invention and without sacrificing its chief advantages.

What I claim is:

1. A variable speed drive mechanism for a source of power rotating at a constant speed comprising:

a drive wheel rotatably driven by the power source about an axis of rotation;

a power takeoff wheel rotatably mounted for independent rotation about said axis of rotation;

power transmitting means rotatably mounted between and operably connecting the drive wheel with the power takeoff wheel to cause rotation of the power takeoff wheel in response to rotation of the drive wheel; and regulator means for translating the power transmitting means without disengagement from said wheels and while the drive wheel is rotating, along the path concentric with said axis of rotation to vary the speed of rotation of the power takeoff wheel 2. The mechanism of claim 1, wherein the regulator means for moving the power transmitting means comprises:

a control wheel rotatably mounted about said axis of rotation and located between the drive wheel and the power takeoff wheel;

means for rotatably capturing the power transmitting means within the control wheel; and means for rotating the control wheel independent of rotation of the drive wheel to vary the speed of rotation of the power takeoff wheel.

3. The mechanism of claim 2, wherein the power transmitting means comprises at least three balls rotatably captured in sockets in the control wheel.

4. The mechanism of claim 3, wherein the power takeoff wheel rotates concentrically around the outer periphery of the drive wheel.

5. The mechanism of claim 4, wherein the control wheel comprises an annular drum located between the concentrically rotating drive wheel and power takeoff wheel, said drum having a plurality of circumferentially spaced sockets for rotatably capturing the balls.

6. The mechanism of claim 5, wherein the means for rotating the drum about said axis of rotation comprises a gear connected to the drum and a variable speed drive motor operatively connected to said gear.

7. The mechanism of claim 5, including a ball race around the outer periphery of the drive wheel and a cooperating ball race around the inner periphery of the power takeoff wheel, said balls being rotatably mounted in spaced relation between balls races by the spaced sockets in the annular drum.

8. The mechanism of claim 7, including biasing means for securing the balls into tight engagement between the drive wheel and the power takeoff wheel.

9. The mechanism of claim 8, including a main drive shaft rotatably driven by the power source and in which the biasing means comprises a pair of discs mounted on the drive shaft for rotation therewith and cooperating to form the drive wheel, each of said discs having a slanted face adjacent each other to form the ball race on the outer periphery of the drive wheel, at least one of said discs being slidable along the drive shaft, and a spring urging the slidable disc toward the other disc to keep the balls in tight engagement with the power takeoff wheel.

10. The mechanism of claim 1, wherein the power takeoff wheel comprises a pulley sheave.

11. In a motion picture projector having a main source of power rotating at a constant speed, a variable speed drive mechanism comprising:
   a drive wheel rotatably driven by the power source about an axis of rotation;
   a pulley sheave rotatably mounted for independent rotation about said axis of rotation;
   A plurality of balls rotatably mounted between and operably connecting the drive wheel with the pulley sheave to cause rotation of the pulley sheave in response to rotation of the drive wheel; and
   regulator means for translating the balls without disengagement from the drive wheel and pulley sheave and while the drive wheel is rotating along a path concentric with said axis of rotation to vary the speed of rotation of the pulley sheave.